United States Patent
Ma

(10) Patent No.: US 12,095,109 B1
(45) Date of Patent: Sep. 17, 2024

(54) ENERGY STORAGE DEVICE

(71) Applicant: XIAMEN HITHIUM ENERGY STORAGE TECHNOLOGY CO., LTD., Fujian (CN)

(72) Inventor: Yaqiang Ma, Fujian (CN)

(73) Assignee: XIAMEN HITHIUM ENERGY STORAGE TECHNOLOGY CO., LTD., Fujian (CN)

( * ) Notice: Subject to any disclaimer, the term of this patent is extended or adjusted under 35 U.S.C. 154(b) by 0 days.

(21) Appl. No.: 18/644,248

(22) Filed: Apr. 24, 2024

(30) Foreign Application Priority Data

Jun. 26, 2023 (CN) .......................... 202310753913.X

(51) Int. Cl.
| | |
|---|---|
| *H01M 50/271* | (2021.01) |
| *H01M 10/613* | (2014.01) |
| *H01M 10/6554* | (2014.01) |
| *H01M 10/6567* | (2014.01) |
| *H01M 50/209* | (2021.01) |
| *H01M 50/262* | (2021.01) |
| *H01M 50/296* | (2021.01) |

(52) U.S. Cl.
CPC ....... *H01M 50/271* (2021.01); *H01M 10/613* (2015.04); *H01M 10/6554* (2015.04); *H01M 10/6567* (2015.04); *H01M 50/209* (2021.01); *H01M 50/262* (2021.01); *H01M 50/296* (2021.01)

(58) Field of Classification Search
CPC .......................... H01M 50/271; H01M 10/6554
See application file for complete search history.

(56) References Cited

U.S. PATENT DOCUMENTS

2023/0095593 A1  3/2023  Meng et al.

FOREIGN PATENT DOCUMENTS

| CN | 208127275 U | | 11/2018 |
|---|---|---|---|
| CN | 209963789 U | | 1/2020 |
| CN | 112582721 A | * | 3/2021 |
| CN | 212648398 U | | 3/2021 |
| CN | 215377551 U | | 12/2021 |
| CN | 216213779 U | | 4/2022 |
| CN | 217691353 U | | 10/2022 |

(Continued)

OTHER PUBLICATIONS

International Search Report dated Apr. 18, 2024 received in International Application No. PCT/CN2024/076205.

(Continued)

*Primary Examiner* — Maria Laios
*Assistant Examiner* — Jordan E Berresford
(74) *Attorney, Agent, or Firm* — Scully, Scott, Murphy & Presser, P.C.

(57) ABSTRACT

An energy storage device is provided. The energy storage device includes: an electrical module, where the electrical module includes an electrical cabinet provided with a receiving cavity; battery modules, where a number of the battery modules is two, the electrical module is sandwiched between the two battery modules, and the two battery modules respectively cover both ends of the receiving cavity; and first sealing members, where the first sealing members are arranged around the receiving cavity, and the first sealing members are respectively pressed between the battery modules and the electrical module to seal the receiving cavity.

10 Claims, 7 Drawing Sheets

(56) References Cited

FOREIGN PATENT DOCUMENTS

| | | | |
|---|---|---|---|
| CN | 115360460 A | | 11/2022 |
| CN | 218385368 U | | 1/2023 |
| CN | 218783086 U | | 3/2023 |
| CN | 115911674 A | | 4/2023 |
| CN | 116544575 A | | 8/2023 |
| CN | 219697339 U | * | 9/2023 |
| DE | 10 2018 222 706 A1 | | 6/2020 |
| WO | 2023/060519 A1 | | 4/2023 |

OTHER PUBLICATIONS

Chinese Notice of Allowance dated Aug. 10, 2023 received in Chinese Application No. 202310753913.X.

\* cited by examiner

ENERGY STORAGE DEVICE

CROSS-REFERENCE TO RELATED APPLICATION

The present application is based upon and claims the benefit of priority to Chinese Patent Application No. 202310753913.X, filed on Jun. 26, 2023, the entire contents of which are incorporated herein by reference for all purposes.

TECHNICAL FIELD

The present application relates to the field of energy storage technology, and in particular, to an energy storage device.

BACKGROUND

Energy storage devices are widely used in the field of new energy. The energy storage device usually needs to be sealed to prevent droplets and dust from invading the interior of the energy storage device and causing short circuit or damage.

SUMMARY

An energy storage device includes:
an electrical module, where the electrical module includes an electrical cabinet provided with a receiving cavity;
battery modules, where a number of the battery modules is two, the electrical module is sandwiched between the two battery modules, and the two battery modules respectively cover both ends of the receiving cavity; and
first sealing members, where the first sealing members are arranged around the receiving cavity, and the first sealing members are respectively pressed between the battery modules and the electrical module to seal the receiving cavity;
where each of the battery modules includes a box, a cover plate, cells and a second sealing member, the box is provided with an accommodation cavity, the cells are accommodated in the accommodation cavity, the cover plate is provided on the box and caps the accommodation cavity, the second sealing member is arranged around the accommodation cavity, and the second sealing member is pressed between the cover plate and the box to seal the accommodation cavity;
each of the battery modules further includes a liquid cooling plate connected to the box and used to cool down the cells, and all the cells are placed naked in the accommodation cavity and share the liquid cooling plate;
each of the battery modules further includes a fixing member, a first liquid cooling connector and a first electrical connector, the fixing member is connected to the box and is located in the accommodation cavity, the first liquid cooling connector and the first electrical connector are both arranged on the fixing member, the first liquid cooling connector is connected to the liquid cooling plate and the electrical module, and the first electrical connector is electrically connected to an electrode of the battery module and the electrical module.

Figure 1:
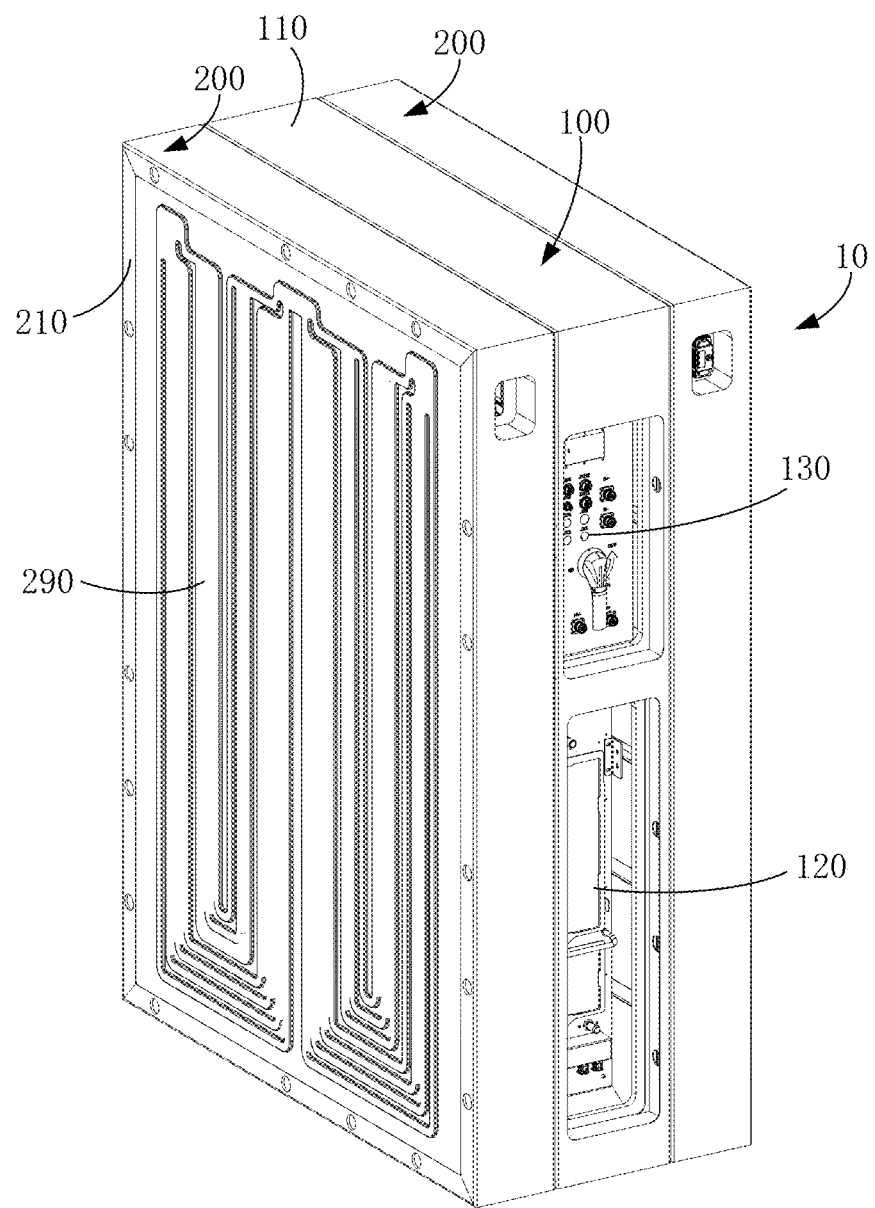
FIG. 1 is a schematic three-dimensional structural view of an energy storage device according to an embodiment.

Reference signs: energy storage device 10, electrical module 100, electrical cabinet 110, receiving cavity 111, limiting groove 112, liquid cooling unit 120, controller 130, second liquid cooling connector 160, second electrical connector 170, bolt 180, battery module 200, box 210, accommodation cavity 211, cover plate 220, mounting hole 221, cell 230, second sealing member 240, fixing member 250, first liquid cooling connector 260, first electrical connector 270, copper bar 280, liquid cooling plate 290, positive terminal 201, negative terminal 202, first sealing member 300, positioning pin 410, positioning hole 420.

DETAILED DESCRIPTION

In order to make the above objects, features and advantages of the present application more obvious and understandable, the specific implementations of the present application will be described in detail below with reference to the accompanying drawings. In the following description, numerous specific details are set forth in order to provide a thorough understanding of the present application. However, the present application can be implemented in many other ways different from those described here. Those skilled in the art can make similar improvements without violating the connotation of the present application. Therefore, the present application is not limited by the specific embodiments disclosed below.

In the description of the present application, it should be understood that if the terms "center", "longitudinal", "transverse", "length", "width", "thickness", "upper", "lower", "front", "back", "left", "right", "vertical", "horizontal", "top", "bottom", "inside", "outside", "clockwise", "counterclockwise", "axial", "radial", "circumferential", etc. appear, the orientations or positional relationships indicated by these terms are based on the orientations or positional relationships shown in the drawings, which is only for the convenience of describing the present application and simplifying the description, rather than indicating or implying that the device or element referred to must have a specific orientation, be constructed and operate in a specific orientation, and therefore these terms cannot be construed as a limitation on the present application.

In addition, if the terms "first" and "second" appear, these terms are used for descriptive purposes only and cannot be understood as indicating or implying the relative importance or implicitly indicating the quantity of the indicated technical features. Therefore, features defined as "first" and "second" may explicitly or implicitly include at least one of these features. In the description of the present application, if the term "a plurality of" or "multiple" appears, the meaning of "a plurality of" or "multiple" is at least two, such as two, three, etc., unless otherwise expressly and specifically limited.

In the present application, unless otherwise expressly stated and limited, if the terms "mount", "connect", "couple", "fix", etc. appear, these terms should be understood in a broad sense. For example, it can be a fixed connection or a detachable connection, or it can be integrated; it can be a mechanical connection or an electrical connection; it can be a direct connection or an indirect connection through an intermediate medium; it can be an internal connection between two elements or the interaction between two elements, unless otherwise expressly limited. For those of ordinary skill in the art, the specific meanings of the above terms in the present application can be understood according to specific circumstances.

In the present application, unless otherwise explicitly stated and limited, if a first feature is "on" or "below" a second feature or similar descriptions, the meaning may be that the first and second features are in direct contact, or the first and second features are in indirect contact through an intermediary. Furthermore, the first feature "on", "above" and "over" the second feature may mean that the first feature is directly above or diagonally above the second feature, or simply means that the first feature has a greater horizontal height than the second feature. The first feature "under", "below" and "beneath" the second feature may mean that the first feature is directly below or diagonally below the second feature, or simply means that the first feature has a smaller horizontal height than the second feature.

It should be noted that if an element is referred to as being "fixed to" or "disposed on" another element, it can be directly on another element or an intervening element may also be present. If an element is said to be "connected" to another element, it can be directly connected to another element or there may also be an intervening element. If present, the terms "vertical", "horizontal", "upper", "lower", "left", "right" and similar expressions used in the present application are for illustrative purposes only and are not meant to be exclusive implementation.

For the traditional energy storage devices, the sealing treatment will lead to a complex structure of the energy storage device, thereby increasing the manufacturing cost of the energy storage device.

One technical problem solved by the present application is how to reduce the manufacturing cost of the energy storage device after sealing treatment.

Figure 2:
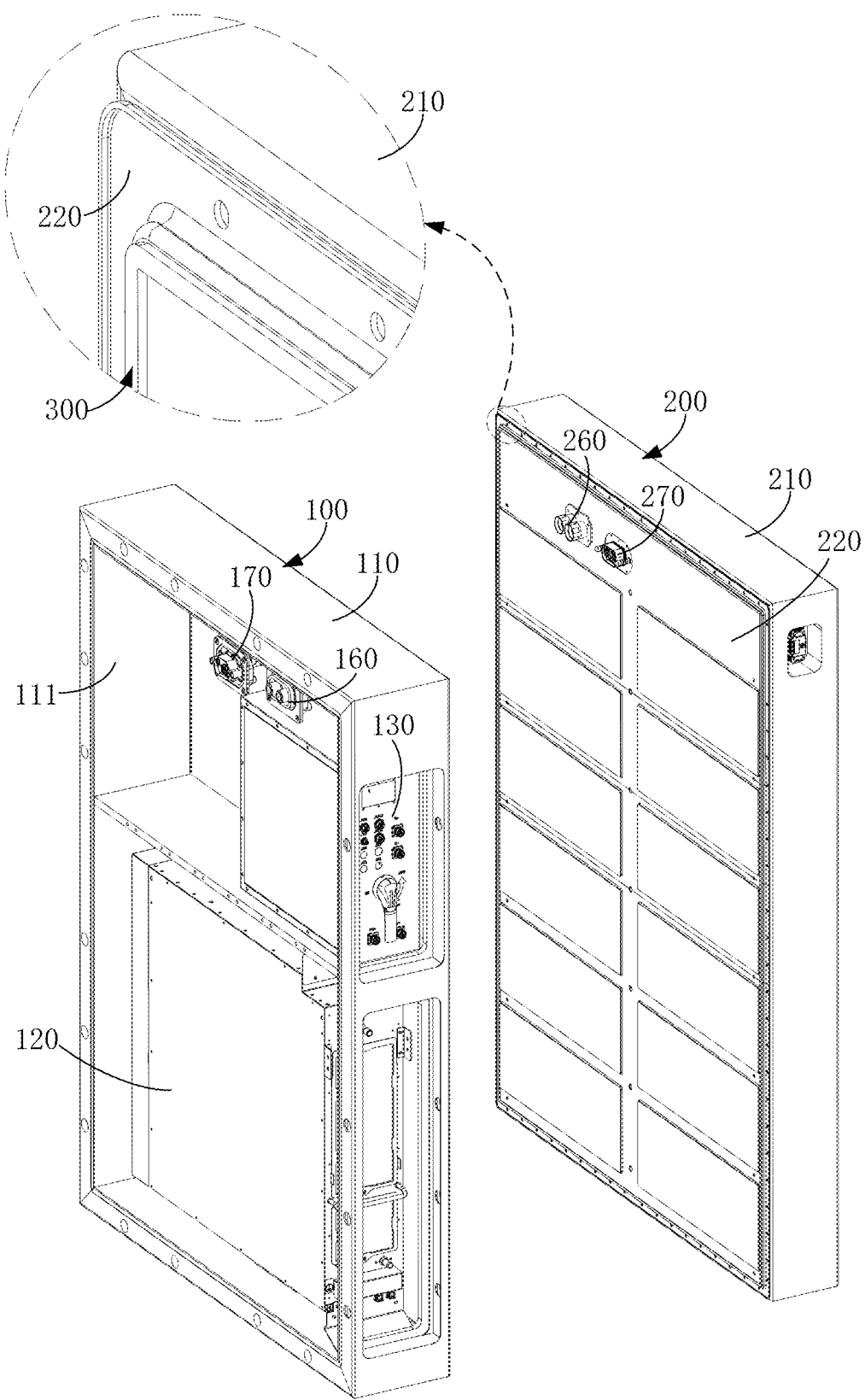
FIG. 2 is a schematic view of an exploded structure of the energy storage device shown in FIG. 1 with one battery module removed.
Figure 3:
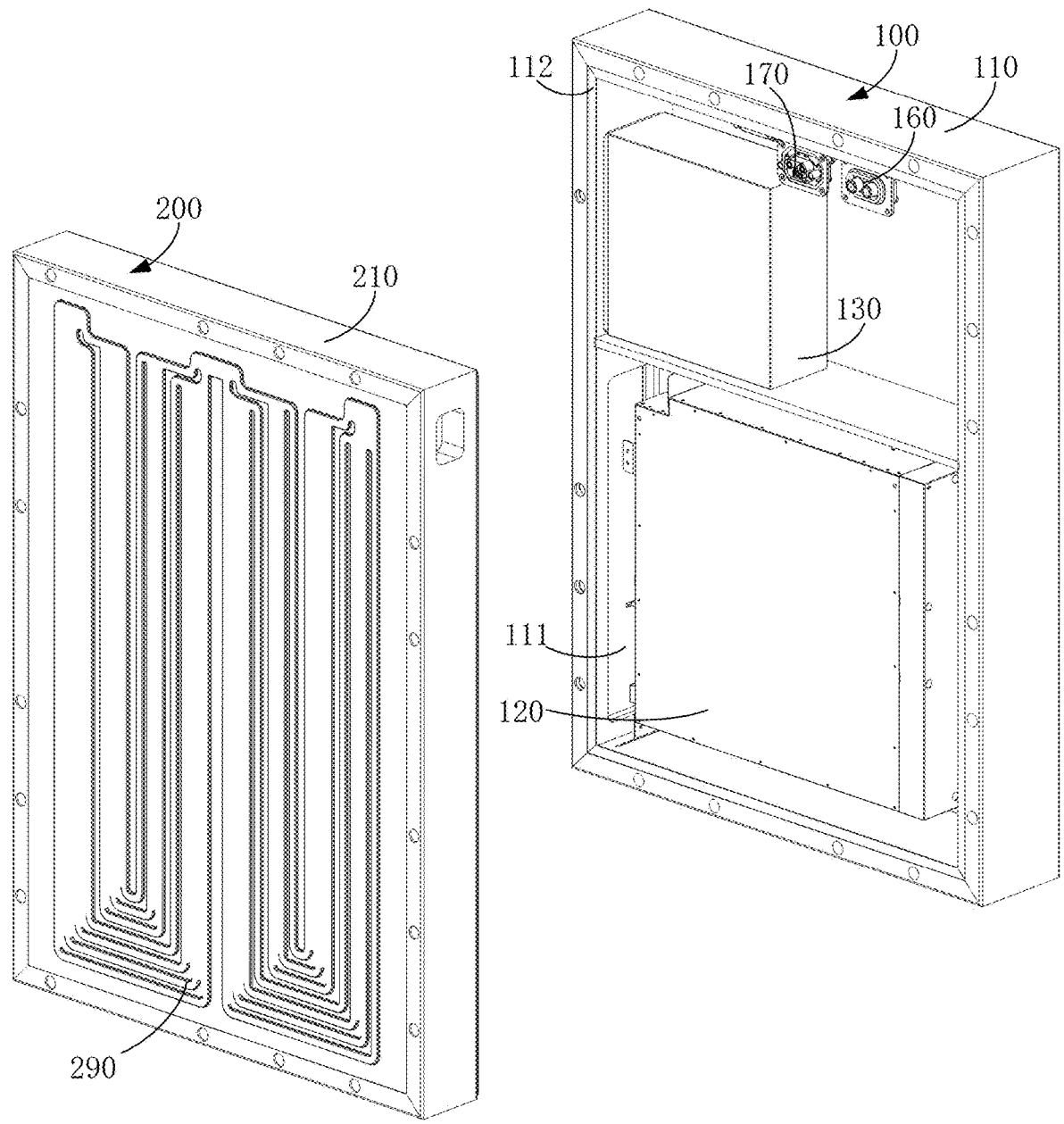
FIG. 3 is a schematic structural view of FIG. 2 from another perspective.

Referring to FIG. 1, FIG. 2 and FIG. 3, an energy storage device 10 provided in an embodiment of the present application includes an electrical module 100, a battery module 200 and a first sealing member 300. The battery module 200 can be disposed on the electrical module 100 in a stacked manner, and the first sealing member 300 is pressed between the electrical module 100 and the battery module 200.

Figure 4:
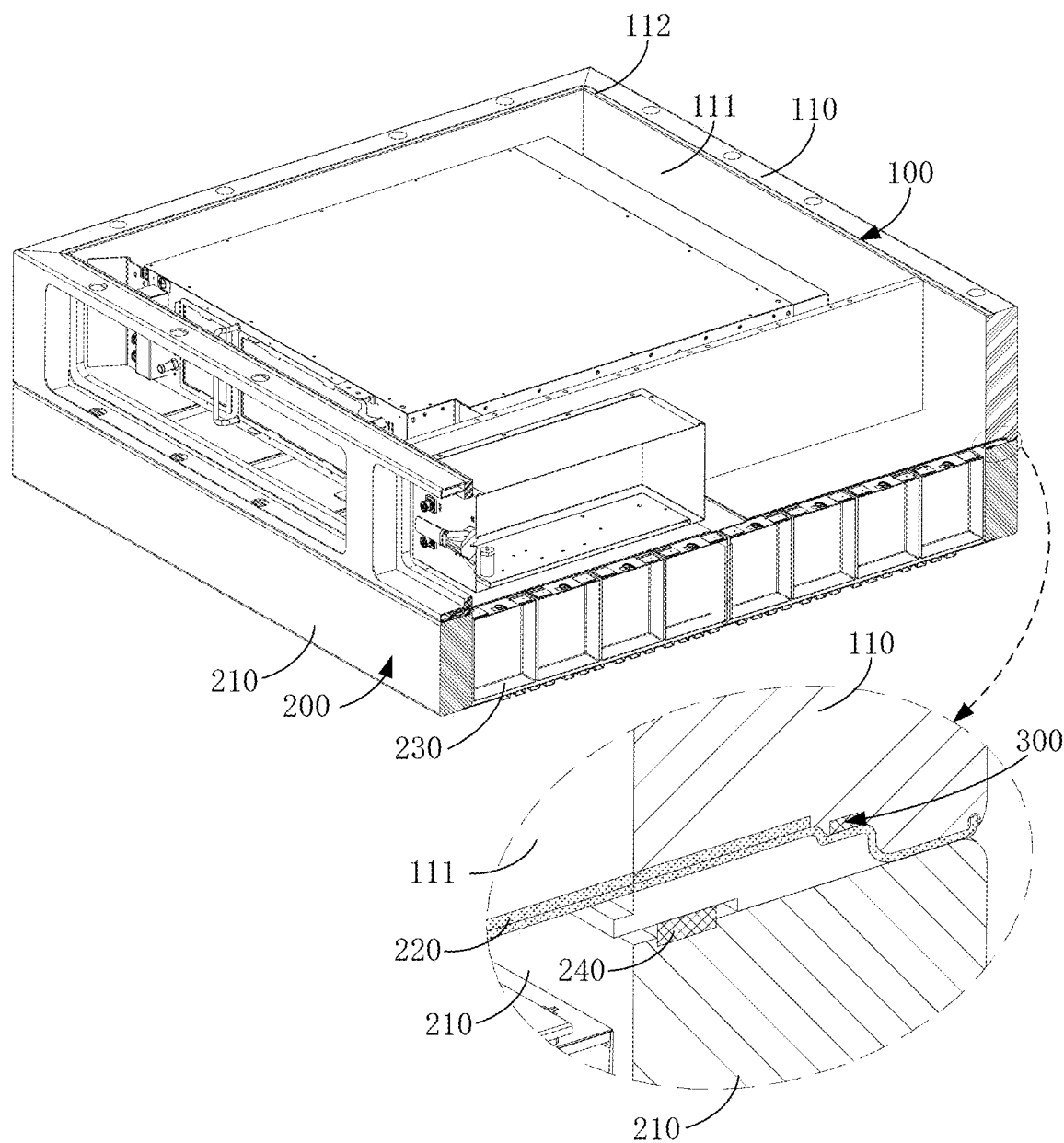
FIG. 4 is a schematic three-dimensional cross-sectional structural view of the energy storage device shown in FIG. 1 with one battery module removed.

Referring to FIG. 2, FIG. 3 and FIG. 4, the electrical module 100 includes an electrical cabinet 110. The electrical cabinet 110 is provided with a receiving cavity 111. The receiving cavity 111 is used to accommodate other component(s) of the electrical module 100. The electrical cabinet 110 is also provided with a limiting groove 112. The limiting groove 112 may be formed by recessing the surface of the electrical cabinet 110 to a set depth. The limiting groove 112 is arranged around the opening of the receiving cavity 111. The first sealing member 300 may be a sealing ring. The first sealing member 300 cooperates with the limiting groove 112. The limiting groove 112 plays a good positioning role for the first sealing member 300 and improves the assembly efficiency and accuracy of the first sealing member 300. The limiting groove 112 may also be provided on the battery module 200. When the battery module 200 is stacked on the electrical module 100, the battery module 200 may cover the receiving cavity 111, so that the first sealing member 300 is pressed between the electrical module 100 and the battery module 200, and then the first sealing member 300 plays a good sealing role on the receiving cavity 111.

If the electrical module and the battery module share one cabinet, the cabinet is separated by a partition to form an electrical compartment and a battery compartment. The electrical module is housed in the electrical compartment, and the battery module is housed in the battery compartment. An electrical cabinet door is used to cap the battery compartment, and a battery cabinet door is used to cap the battery compartment. Therefore, it is necessary to fill a gap between the electrical cabinet door and the cabinet to seal the electrical compartment. It is also necessary to fill a gap between the battery cabinet door and the cabinet to seal the battery compartment. It is also necessary to provide a sealing member on the partition to seal and isolate the electrical compartment and the battery compartment. This will make the sealing structure of the entire energy storage device more complex, thereby increasing the manufacturing cost of the energy storage device after sealing treatment.

For the energy storage device 10 in the above embodiment, the battery module 200 directly seals the receiving cavity 111 of the electrical module 100 through the first sealing member 300, so that the battery module 200 can serve as a cabinet door for sealing the receiving cavity 111 of the electrical module 100, thereby eliminating the need to provide an additional cabinet door on the electrical cabinet 110 for sealing the receiving cavity 111. This will simplify the sealing structure of the energy storage device 10, thereby reducing the manufacturing cost of the energy storage device 10 after the sealing treatment. It can be understood that by sealing the receiving cavity 111, external dust and liquid droplets can be effectively prevented from entering the receiving cavity 111, thereby avoiding corrosion of component(s) in the receiving cavity 111 or causing short circuit.

Figure 7:
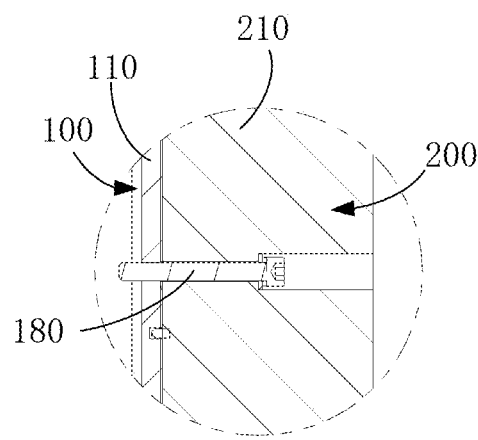
FIG. 7 is a first partial plan cross-sectional structural view of the energy storage device shown in FIG. 1.

Referring to FIG. 1, in some embodiments, the battery module 200 and the electrical module 100 may have substantially the same structure. For example, both may be substantially rectangular, and the coverage areas of the two may be substantially the same. When the battery module 200 and the electrical module 100 are stacked on each other, the outer lateral surfaces of the electrical module 100 and the battery module 200 may be flush with each other, which can improve the overall consistency of the appearance of the entire energy storage device 10, and also facilitates the installation and transportation of the energy storage device 10. After the battery module 200 and the electrical module 100 are stacked on each other, the battery module 200 and the electrical module 100 may be connected through a fastener such as a bolt 180 (as shown in FIG. 7), so that the battery module 200 and the electrical module 100 form a detachable connection relationship.

Referring to FIG. 1, in some embodiments, for example, the receiving cavity 111 of the electrical cabinet 110 has two openings, and the two openings are spaced apart along the thickness direction of the electrical cabinet 110. In this case, two battery modules 200 need to be provided, and the two battery modules 200 are positioned on opposite sides of the electrical cabinet 110 in the thickness direction, thereby sealing the two openings of the receiving cavity 111. Therefore, the energy storage device 10 includes one electrical module 100 and two battery modules 200. For another example, the receiving cavity 111 of the electrical cabinet 110 has one opening. In this case, only one battery module 200 is needed. The opening of the receiving cavity 111 is sealed by the battery module 200. Therefore, the energy storage device 10 includes one electrical module 100 and one battery module 200.

Figure 5:
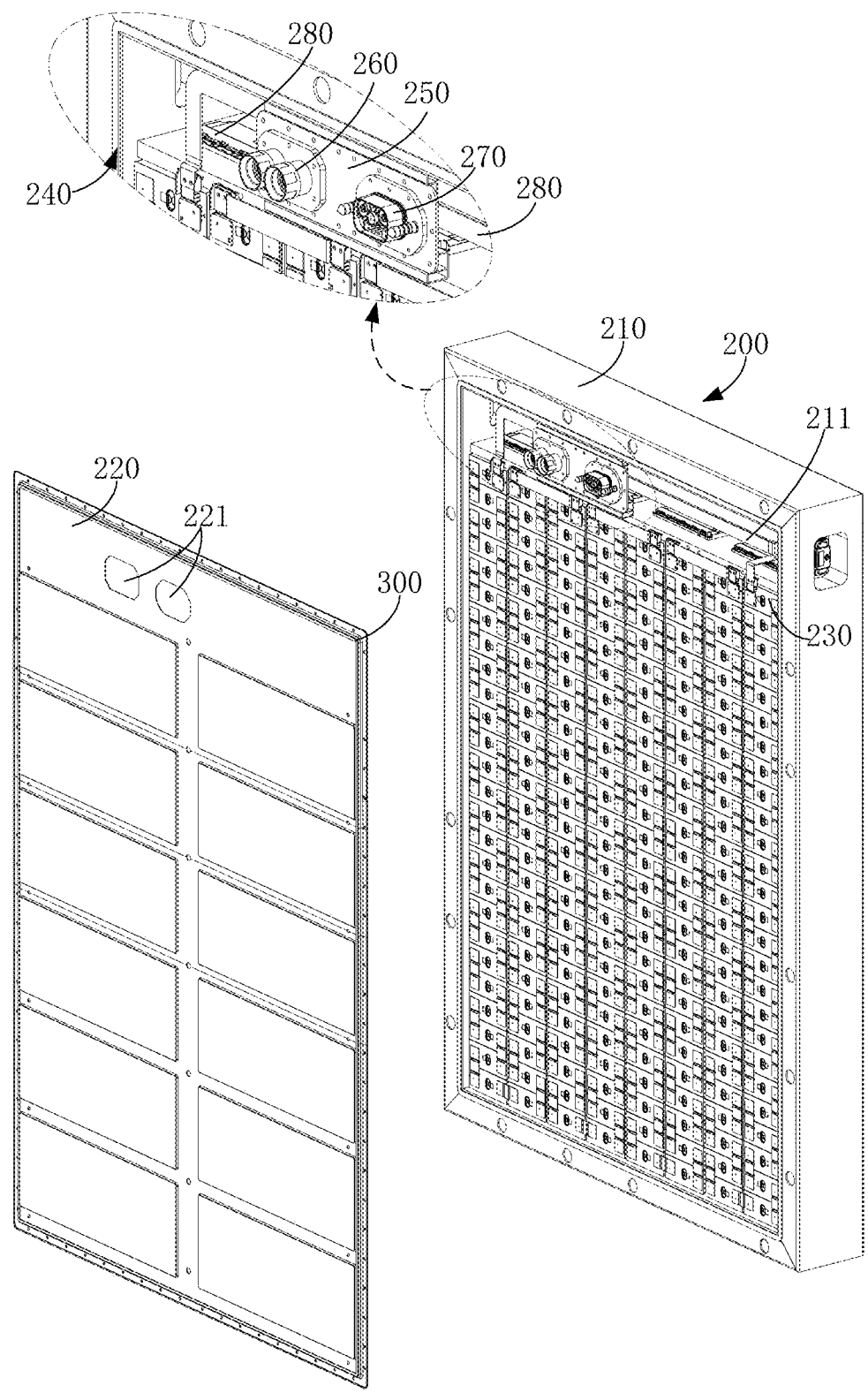
FIG. 5 is an exploded structural view of the battery module in the energy storage device shown in FIG. 1.
Figure 6:
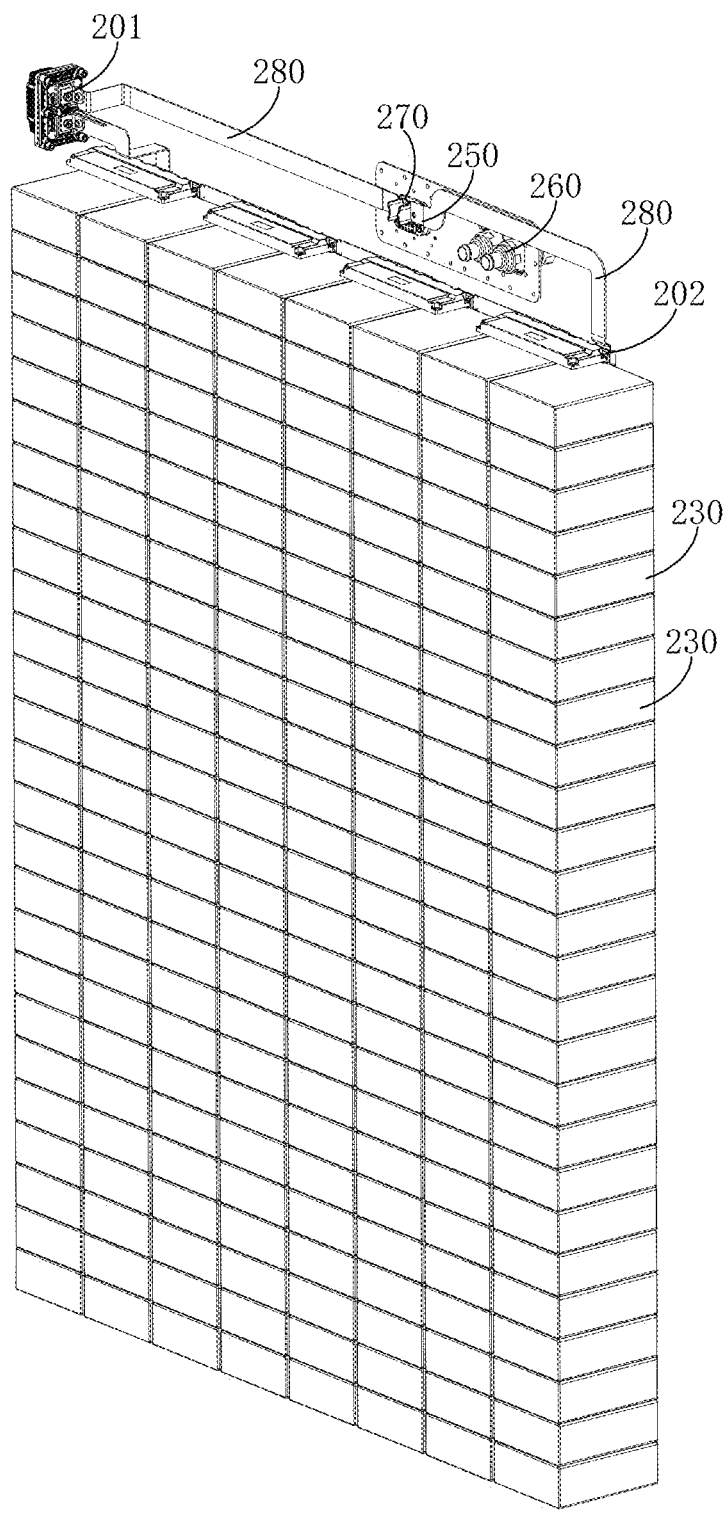
FIG. 6 is a partial structural view of the battery module shown in FIG. 5 with the box and the cover plate removed.

Referring to FIG. 4, FIG. 5 and FIG. 6, in some embodiments, the battery module 200 includes a box 210, a cover plate 220, cells 230 and a second sealing member 240. An accommodation cavity 211 is provided in the box 210. The number of the cells 230 may be multiple, and the multiple cells 230 may be arranged in a matrix and disposed in the accommodation cavity 211, and all the cells 230 are placed bare in the accommodation cavity 211. A positioning groove may be provided on the box 210. The positioning groove may be formed by recessing the surface of the box 210 toward the cover plate 220 to a set depth. The positioning groove is provided around the opening of the accommodation cavity 211. The second sealing member 240 may be a sealing ring. The second sealing member 240 cooperates with the positioning groove. The positioning groove plays a good positioning role for the second sealing member 240 and improves the assembly efficiency and accuracy of the second sealing member 240. The positioning groove may also be provided on the surface of the cover plate 220 facing the box 210. When the battery module 200 is placed on the box 210, the cover plate 220 covers the accommodation cavity 211, so that the second sealing member 240 is pressed between the cover plate 220 and the box 210, and then the second sealing member 240 has a good sealing effect on the accommodation cavity 211. Through the joint action of the first sealing member 300 and the second sealing member 240, the receiving cavity 111 of the electrical module 100 and the accommodation cavity 211 of the battery module 200 can be sealed and isolated, thereby eliminating the need for additional sealing members for isolating and sealing the receiving cavity 111 and the accommodation cavity 211 from each other, thus further simplifying the sealing structure of the energy storage device 10 and reducing the manufacturing cost of the energy storage device 10 after the sealing treatment. It can be understood that by sealing the accommodation cavity 211, external dust and liquid droplets can be effectively prevented from entering the accommodation cavity 211, thereby avoiding corrosion of the cells 230 and other component(s) in the accommodation cavity 211 or causing a short circuit. When the battery module 200 is stacked on the electrical module 100, the first sealing member 300 may be pressed between the cover plate 220 of the battery module 200 and the electrical cabinet 110 of the electrical module 100.

It is assumed that the battery module of the energy storage device adopts a mode including a plurality of battery units, that is, a plurality of battery units are stacked each other to form a battery module. Each battery unit includes a casing, a cover, cells and a sealing member. The number of cells can be multiple. The multiple battery cells are contained in the inner cavity of the casing. The cover is used to cap the inner cavity of the casing. The sealing member is located between the casing and the cover, so that the sealing member seals the inner cavity of the casing. This will cause the battery module to have multiple casings, covers and sealing members, thereby making the structure of the energy storage device 10 more complex and increasing the manufacturing cost of the energy storage device.

For the battery module 200 in the above embodiment, only one box 210, one cover plate 220 and one second sealing member 240 are provided, and all cells 230 are placed naked in the accommodation cavity 211 of the box 210. There is no need to package the cell 230 through the casing, the cover and the sealing member to form multiple battery units. It can be understood that all cells 230 share one box 210, cover plate 220 and second sealing member 240, so that the provision of multiple casings, covers and sealing members for forming the battery units is eliminated. This will simplify the structure of the energy storage device 10 and reduce the manufacturing cost of the energy storage device 10.

Referring to FIG. 4, FIG. 5 and FIG. 6, in some embodiments, the battery module 200 may also include a fixing member 250, a first liquid cooling connector 260, a first electrical connector 270, a copper bar 280, a liquid cooling plate 290 and a third sealing member. The fixing member 250 may be arranged in the accommodation cavity 211, the liquid cooling plate 290 is connected to the box 210, a heat exchange channel is provided in the liquid cooling plate 290, two ends of the heat exchange channel are respectively an inlet and an outlet, and the liquid flows in from the inlet and out from the outlet. The heat generated by the operation of the cell 230 can be conducted to the liquid cooling plate 290. When a liquid with lower temperature is introduced into the heat exchange channel, the liquid will absorb the heat conducted to the liquid cooling plate 290 in the heat exchange channel, and the liquid absorbing the heat will be discharged from the outlet, so that the liquid can dissipate and cool down the liquid cooling plate 290 and the accommodation cavity 211, ensuring that the cell 230 works in a reasonable temperature environment and preventing the cell 230 from being damaged due to excessive temperature.

The fixing member 250 may be a plate-like structure, and the first liquid cooling connector 260 and the first electrical connector 270 are both arranged on the fixing member 250, so that the fixing member 250 serves as a carrier for the first liquid cooling connector 260 and the first electrical connector 270. The first liquid cooling connector 260 may include a liquid inlet pipe and a liquid outlet pipe. Liquid with a lower temperature enters the heat exchange channel through the liquid inlet pipe and the inlet. After absorbing heat, liquid with a higher temperature will flow into the liquid outlet pipe from the heat exchange channel through the outlet. Referring to FIG. 6, the number of copper bars 280 may be two. The positive interface of the first electrical connector 270 can be electrically connected to the positive terminal 201 of the battery module 200 through one of the copper bars 280. The negative interface of the first electrical connector 270 can be electrically connected to the negative terminal 202 of the battery module 200 through the other copper bar 280. The positive terminal 201 and the negative terminal 202 extend in different directions. For example, the positive terminal 201 may extend along the width direction of the battery module 200, while the negative terminal 202 may extend along the thickness direction of the battery module 200. This will facilitate the layout of the two copper bars 280, thereby simplifying the structure of the battery module 200.

The first liquid cooling connector 260 and the first electrical connector 270 can both be fixed on a fixing plate through a snap connection, so that the first liquid cooling connector 260 and the first electrical connector 270 form a quick-plug and quick-change structure, to prevent the first liquid cooling connector 260 and the first electrical connector 270 from being installed on the fixing member 250 through fasteners such as bolts. During the assembly process, the first liquid cooling connector 260 and the first electrical connector 270 can be assembled by a robot, so that the automated assembly of the battery module 200 can be realized, thereby improving the assembly efficiency of the battery module 200 and the entire energy storage device 10 to reduce the manufacturing cost.

If the battery module still uses a mode in which a plurality of battery units are included, the casing of each battery unit needs to have an input port and an output port for liquid inflow and outflow to dissipate and cool down the cells in the battery unit, this will require the installation of connecting pipes at the input and output ports of each battery unit, thereby increasing the number of connecting pipes used and increasing the manufacturing cost of the energy storage device. Moreover, there are a high-voltage connection line and a low-voltage connection line between two adjacent battery units. The high-voltage connection line and low-voltage connection line are used to electrically connect the two battery units. In view of the large number of high-voltage connection lines and low-voltage connection lines, the manufacturing cost of the energy storage device will be further increased.

For the energy storage device 10 in the above embodiment, since all the cells 230 in the battery module 200 share one liquid cooling plate 290, only one inlet and outlet are provided on the liquid cooling plate 290, thereby reducing the number of connecting pipes used, reducing the probability of failure of the energy storage device 10 during manufacturing and operation, thereby reducing the manufacturing cost of the energy storage device 10 and improving the stability and reliability of the operation of the energy storage device 10. In addition, all cells 230 are placed naked in the accommodation cavity 211, which eliminates the need for providing the high-voltage connection line and the low-voltage connection line between two adjacent cells, thereby further reducing the manufacturing cost of the energy storage device 10.

Referring to FIG. 4, FIG. 5 and FIG. 6, in some embodiments, the cover plate 220 is provided with a mounting hole 221. The mounting hole 221 is a through hole that runs through the entire cover plate 220 along the thickness direction of the cover plate 220. The first liquid cooling connector 260 is inserted into one of the mounting holes 221, and the first electrical connector 270 is inserted into the other mounting hole 221. The third sealing member may be a sealing ring, and the third sealing member is pressed between the cover plate 220 and the fixing member 250 to seal the mounting hole 221. For example, the number of the third sealing members is two, and one third sealing member is arranged around the first liquid cooling connector 260 to seal the mounting hole 221 for the first liquid cooling connector 260 to pass through, and the other third sealing member is disposed around the first electrical connector 270 to seal the mounting hole 221 for the first electrical connector 270 to pass through.

Referring to FIGS. 2, 3 and 4, in some embodiments, the electrical module 100 further includes a liquid cooling unit 120, a controller 130, a second liquid cooling connector 160 and a second electrical connector 170. The liquid cooling unit 120 and the controller 130 may both be located in the receiving cavity 111. The liquid cooling unit 120 is connected to the second liquid cooling connector 160, and the second liquid cooling connector 160 is connected to the first liquid cooling connector 260, so that the second liquid cooling connector 160 is connected between the liquid cooling unit 120 and the first liquid cooling connector 260. The liquid with a lower temperature is output through the liquid cooling unit 120, and enters the heat exchange channel of the liquid cooling plate 290 from the inlet sequentially through the second liquid cooling connector 160 and the first liquid cooling connector 260. After absorbing heat, the liquid with a higher temperature returns to the liquid cooling unit 120 from the outlet of the heat exchange channel sequentially through the first liquid cooling connector 260 and the second liquid cooling connector 160, thus realizing the heat dissipation of the cell 230 by the liquid cooling unit 120. The second electrical connector 170 is connected between the controller 130 and the first electrical connector 270. Since the first electrical connector 270 is electrically connected to the positive and negative electrodes of the battery module 200 respectively, this allows the controller 130 to control the voltage of the battery module 200 through the second electrical connector 170 and the first electrical connector 270, so that the battery module 200 forms high-voltage and low-voltage electrical connections through the controller 130.

In some embodiments, the second liquid cooling connector 160 and the second electrical connector 170 may both be fixed on the electrical cabinet 110 through a snap connection, such that the second liquid cooling connector 160 and the second electrical connector 170 forms a quick-plug and quick-change structure to prevent the second liquid cooling connector 160 and the second electrical connector 170 from being installed on the electrical cabinet 110 through fasteners such as bolts. During the assembly process, the second liquid cooling connector 160 and the second electrical connector 170 can be assembled by a robot, so that the automated assembly of the electrical module 100 can be realized, thereby improving the assembly efficiency of the electrical module 100 and the entire energy storage device 10 to reduce the manufacturing cost.

In some embodiments, one of the first liquid cooling connector 260 and the second liquid cooling connector 160 is a connecting plug and the other is a connecting socket. Through the assembly manner of the connecting plug and the connecting socket, the assembly efficiency between the first liquid cooling connector 260 and the second liquid cooling connector 160 can be improved, and it also enables the first liquid cooling connector 260 and the second liquid cooling connector 160 to form a detachable connection relationship. Similarly, one of the first electrical connector 270 and the second electrical connector 170 is a connecting plug and the other is a connecting socket. Through the assembly manner of the connecting plug and the connecting socket, the assembly efficiency between the first electrical connector 270 and the second electrical connector 170 can be improved, and it also enables the first electrical connector 270 and the second electrical connector 170 to form a detachable connection relationship. In view of the improved assembly efficiency between the first liquid cooling connector 260 and the second liquid cooling connector 160 and between the first electrical connector 270 and the second electrical connector 170, the assembly efficiency of the energy storage device 10 can also be improved so as to reduce the manufacturing cost.

Figure 8:
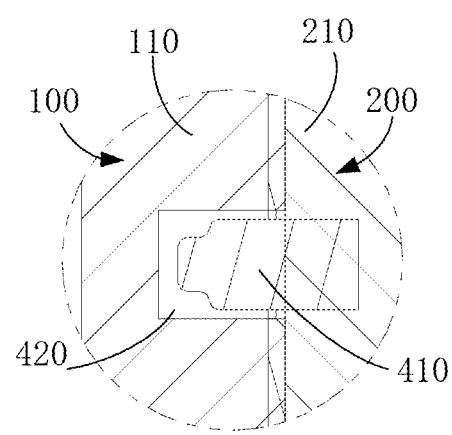
FIG. 8 is a second partial plan cross-sectional structural view of the energy storage device shown in FIG. 1.

Referring to FIG. 8, in some embodiments, for the electrical cabinet 110 on the electrical module 100 and the box 210 on the battery module 200, one of the electrical cabinet 110 and the box 210 may be provided with a positioning hole 420 and the other one may be provided with a positioning pin 410. For example, the electrical cabinet 110 may be provided with a positioning hole 420, and the box 210 may be provided with a positioning pin 410. For another example, the electrical cabinet 110 may be provided with a positioning pin 410, and the box 210 may be provided with a positioning hole 420. During the assembly process of the electrical module 100 and the battery module 200, through the cooperation between the positioning hole 420 and the positioning pin 410, the assembly efficiency and assembly accuracy of the electrical module 100 and the battery module 200 can be improved.

Each of the battery modules further includes a third sealing member. The cover plate is provided with a mounting hole for passing through the first liquid cooling connector and the first electrical connector. The third sealing member is pressed between the cover plate and the fixing member to seal the mounting hole.

The first liquid cooling connector and the first electrical connector are both snap-connected to the fixing member.

Each of the battery modules further includes a connecting copper bar. The first electrical connector is electrically connected to a positive terminal and a negative terminal of the battery module through the connecting copper bar. The positive terminal extends along a width direction of the battery module. The negative terminal extends along a thickness direction of the battery module.

The electrical module further includes a liquid cooling unit, a controller, a second liquid cooling connector and a second electrical connector. The liquid cooling unit and the controller are located in the receiving cavity. The second liquid cooling connector and the second electrical connector are both arranged on the electrical cabinet through a snap connection, the second liquid cooling connector is connected between the liquid cooling unit and the first liquid cooling connector, and the second electrical connector is connected between the controller and the first electrical connector.

One of the first liquid cooling connector and the second liquid cooling connector is a connecting plug and the other is a connecting socket; one of the first electrical connector and the second electrical connector is a connecting plug and the other is a connecting socket.

The first sealing member is pressed between the cover plate and the electrical cabinet.

Outer lateral surfaces of the electrical module and the battery modules are flush with each other.

The electrical cabinet is recessed with a limiting groove arranged around the receiving cavity, and the first sealing member cooperates with the limiting groove.

At least one of following solutions are also included:
the electrical module and the battery modules are bolted together;
one of the electrical module and the battery modules includes a positioning pin and the other is provided with a positioning hole, and the positioning pin cooperates with the positioning hole.

One technical effect of the present application is: the battery module is disposed on the electrical module and covers the receiving cavity, and the first sealing member is pressed between the battery module and the electrical module to seal the receiving cavity, that is, the battery module directly seals the receiving cavity of the electrical module through the first sealing member, so that the battery module can serve as a cabinet door for sealing the receiving cavity of the electrical module, thereby eliminating the need for providing an additional cabinet door on the electrical cabinet for sealing the receiving cavity, which simplifies the sealing structure of the energy storage device, thereby reducing the manufacturing cost of the energy storage device after sealing treatment.

All cells are placed bare in the accommodation cavity and share the liquid cooling plate, thus reducing the number of connecting pipes used and reducing the probability of failure of the energy storage device during manufacturing and operation, thereby reducing the manufacturing cost of the energy storage device and improving the stability and reliability of the operation of the device energy storage. In addition, it is possible to eliminate the need for providing the high-voltage connection line and the low-voltage connection line between two adjacent cells, thereby further reducing the manufacturing cost of the energy storage device.

The technical features of the above-described embodiments can be combined in any way. To simplify the description, not all possible combinations of the technical features in the above-described embodiments are described. However, as long as there is no contradiction in the combinations of these technical features, all the combinations should be considered to be within the scope of the present specification.

The above-described embodiments only express several implementations of the present application, and their descriptions are relatively specific and detailed, but they should not be construed as limiting the scope of the patent application. It should be noted that, for those of ordinary skill in the art, several modifications and improvements can be made without departing from the concept of the present application, and these all fall within the protection scope of the present application. Therefore, the protection scope of this patent application should be determined by the appended claims.

What is claimed is:

1. An energy storage device, comprising:
an electrical module, wherein the electrical module comprises an electrical cabinet provided with a receiving cavity;
battery modules, wherein a number of the battery modules is two, the electrical module is sandwiched between the two battery modules, and the two battery modules respectively cover both ends of the receiving cavity; and
first sealing members, wherein the first sealing members are arranged around the receiving cavity, and the first sealing members are respectively pressed between the battery modules and the electrical module to seal the receiving cavity;
wherein each of the battery modules comprises a box, a cover plate, cells and a second sealing member, the box is provided with an accommodation cavity, the cells are accommodated in the accommodation cavity, the cover plate is provided on the box and caps the accommodation cavity, the second sealing member is arranged around the accommodation cavity, and the second sealing member is pressed between the cover plate and the box to seal the accommodation cavity;
each of the battery modules further comprises a liquid cooling plate connected to the box and used to cool down the cells, and all the cells are placed naked in the accommodation cavity and share the liquid cooling plate;
each of the battery modules further comprises a fixing member, a first liquid cooling connector and a first electrical connector, the fixing member is connected to the box and is located in the accommodation cavity, the first liquid cooling connector and the first electrical connector are both arranged on the fixing member, the first liquid cooling connector is connected to the liquid cooling plate and the electrical module, and the first electrical connector is electrically connected to an electrode of the battery module and the electrical module.

2. The energy storage device according to claim 1, wherein each of the battery modules further comprises a third sealing member, the cover plate is provided with a mounting hole for passing through the first liquid cooling connector and the first electrical connector, and the third sealing member is pressed between the cover plate and the fixing member to seal the mounting hole.

3. The energy storage device according to claim 1, wherein the first liquid cooling connector and the first electrical connector are both snap-connected to the fixing member.

4. The energy storage device according to claim 1, wherein each of the battery modules further comprises a connecting copper bar, and the first electrical connector is connected to a positive terminal and a negative terminal of the battery module through the connecting copper bar, the positive terminal extends along a width direction of the battery module, and the negative terminal extends along a thickness direction of the battery module.

5. The energy storage device according to claim 1, wherein the electrical module further comprises a liquid cooling unit, a controller, a second liquid cooling connector and a second electrical connector, the liquid cooling unit and the controller are located in the receiving cavity, the second liquid cooling connector and the second electrical connector are both arranged on the electrical cabinet through a snap connection, the second liquid cooling connector is connected between the liquid cooling unit and the first liquid cooling connector, and the second electrical connector is connected between the controller and the first electrical connector.

6. The energy storage device according to claim 5, wherein one of the first liquid cooling connector and the second liquid cooling connector is a connecting plug and the other is a connecting socket; one of the first electrical connector and the second electrical connector is a connecting plug and the other is a connecting socket.

7. The energy storage device according to claim 1, wherein the first sealing member is pressed between the cover plate and the electrical cabinet.

8. The energy storage device according to claim 1, wherein outer lateral surfaces of the electrical module and the battery modules are flush with each other.

9. The energy storage device according to claim 1, wherein the electrical cabinet is recessed with a limiting groove arranged around the receiving cavity, and the first sealing member cooperates with the limiting groove.

10. The energy storage device according to claim 1, wherein
the electrical module and the battery modules are bolted together; and/or
one of the electrical module and the battery modules comprises a positioning pin and the other is provided with a positioning hole, and the positioning pin cooperates with the positioning hole.

\* \* \* \* \*